March 26, 1963 G. W. ARMSTRONG ETAL 3,082,433
WATER CLOSETS
Filed March 11, 1960 3 Sheets-Sheet 1
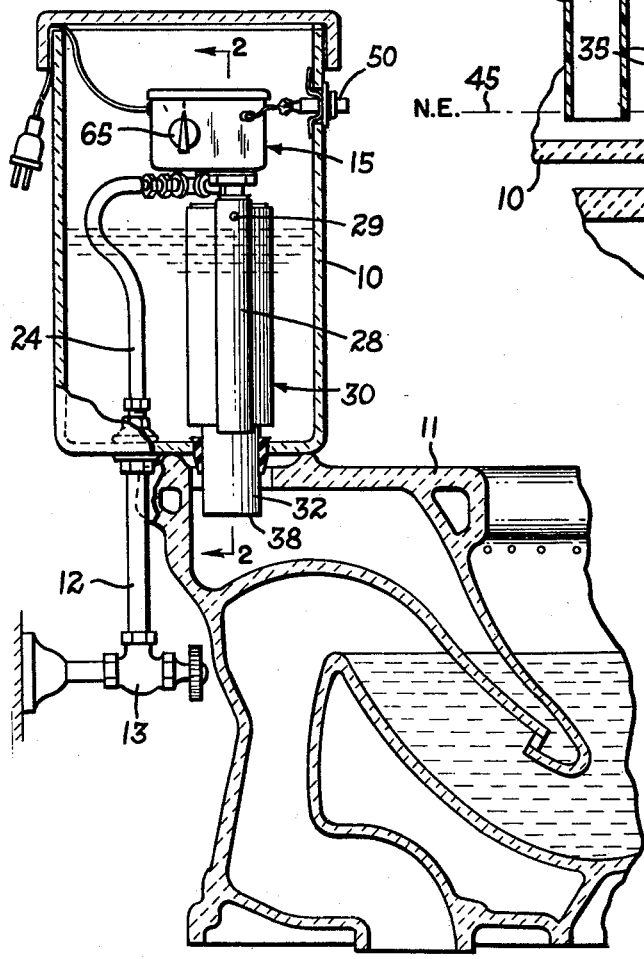
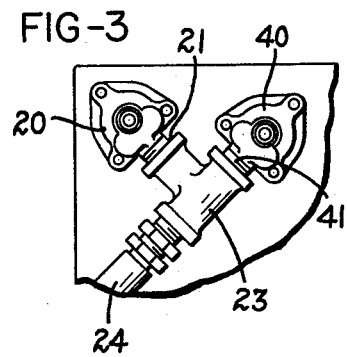
INVENTORS
GEORGE W. ARMSTRONG
BY & ROBERT J. NEFF
Marechal, Biebel, French & Bugg
ATTORNEYS

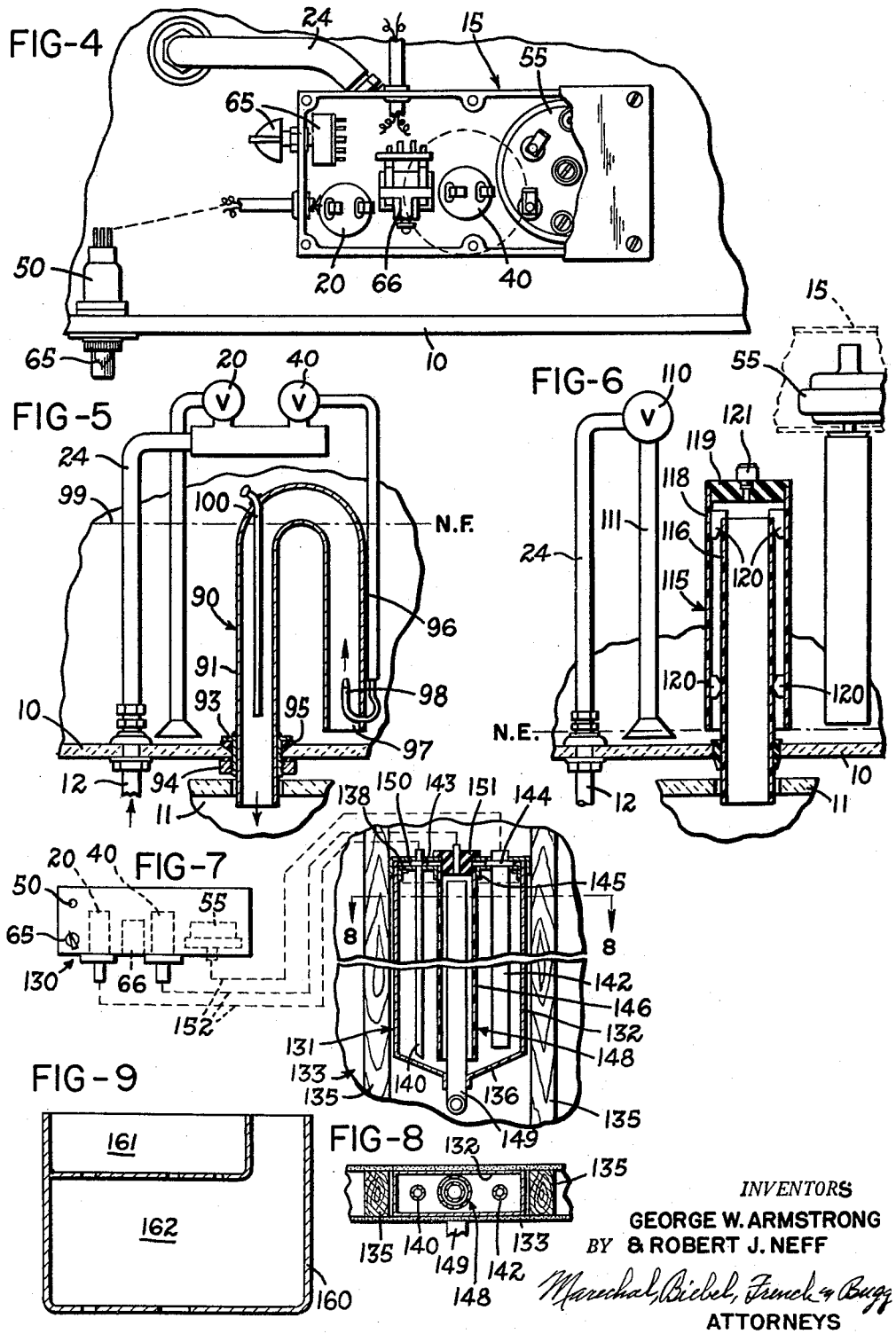

March 26, 1963  G. W. ARMSTRONG ETAL  3,082,433
WATER CLOSETS
Filed March 11, 1960  3 Sheets-Sheet 3
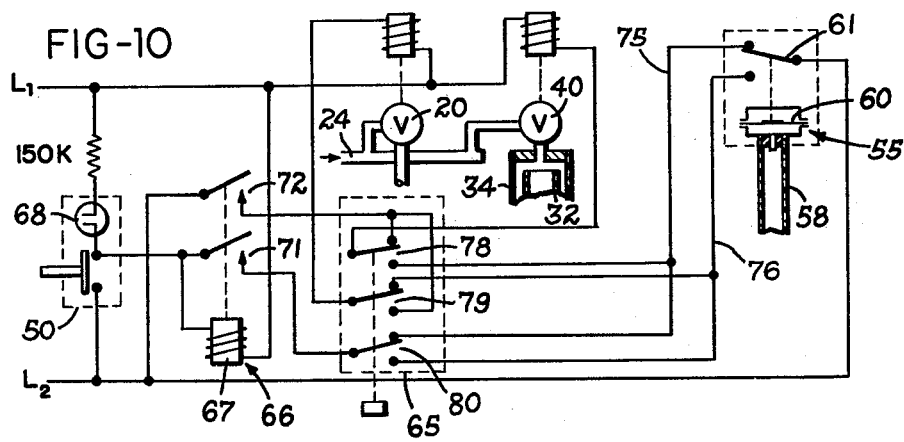
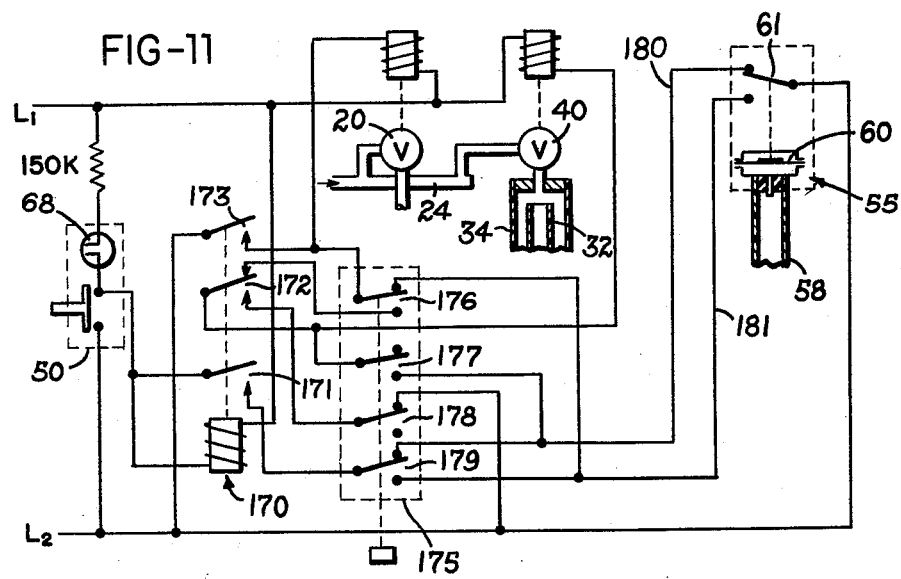
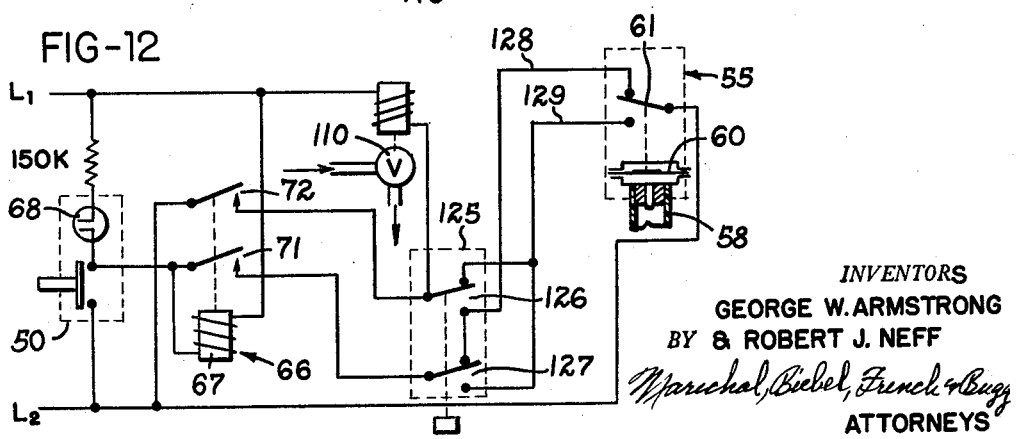
INVENTORS
GEORGE W. ARMSTRONG
BY & ROBERT J. NEFF
Marechal, Biebel, French & Bugg
ATTORNEYS United States Patent Office 3,082,433
Patented Mar. 26, 1963

3,082,433
WATER CLOSETS
George W. Armstrong, % O. B. Armstrong & Son, Fairborn, Ohio, and Robert J. Neff, Rte. 1, Medway, Ohio
Filed Mar. 11, 1960, Ser. No. 14,226
15 Claims. (Cl. 4—44)

This invention relates to water closets.

The common water closet usually includes a water storage tank of vitrified material and a bowl. The tank includes a float-operated water inlet valve which causes the tank to fill from a water source and remain full between uses. The filling of the tank is therefore controlled by a moving arm and float arrangement, and the associated water inlet valve is usually submerged and affected by such well known malfunctions as a leaky float, lime deposits on the moving parts, and corrosion. Additionally, the ball valve through which the tank drains into the bowl for flushing is subject to sticking and water logging, while a vortex action of the draining water in the tank reduces the effectiveness of the flushing action. During humid conditions of use, moisture condenses and collects on the outer surfaces of the tank, eventually forming pools of water on the floor beneath the tank.

The present invention overcomes these difficulties and others by providing a water closet with apparatus for controlling the complete cycle of operation including the filling of the water tank and the discharging of this water into the bowl for flushing. All moving parts associated with the usual water closet in contact with the water within the tank are eliminated. This is accomplished, in part, by a siphon arrangement having one end opening into the tank for the withdrawal of water therefrom and another end arranged to discharge into the bowl, in a cycle of operation. The invention includes control apparatus for filling the tank and for initiating the siphoning action of the siphon to empty the water therefrom into the bowl. Such apparatus preferably includes an electric solenoid fill valve controlled by a liquid level responsive switch establishing upper and lower water levels in the tank. A relay circuit and a push button switch are preferably provided to initiate and control the cycle of operation, and for initiating the siphoning action.

The arrangement of the apparatus of this invention includes two possible modes of operation, that is, normally full tank operation and normally empty tank operation. The latter mode of operation is particularly useful in eliminating the condensation and collection of moisture on the outer surface of the tank during humid conditions. The control apparatus preferably includes a transfer switch through which one may select the desired mode of operation.

In one embodiment, the control apparatus is arranged so that the volume of the flushing water in the tank is supplemented by incoming water through an electric solenoid valve and hence the physical size of the storage tank may be proportionally reduced. The invention therefore lends itself to versatility in design and installation. Also, the control apparatus of the invention may conveniently be located in a position remote from the tank itself, providing a tank having no moving parts which may be conveniently and safely built into a cabinet or a wall.

On the other hand, the invention is readily adapted for installation into existing tank and bowl arrangements, with a minimum of modification of the water closet after the removal of the water level float valve and the ball valve, by taking advantage of the existing openings and fittings in the tank.

It is therefore a principal object of this invention to provide a water closet as outlined above having no moving parts in contact with the water, characterized by a long and trouble-free service life.

A further object of this invention is to provide a water closet as outlined above for the automatic operation of a water tank in either a normally empty mode or a normally filled mode.

An additional object of this invention is to provide a water closet as outlined above having apparatus for controlling the cycle of operation and employing a siphon for the withdrawal of water from the tank into the bowl.

A still further object of this invention is to provide a water closet as outlined above having control apparatus adapted for the remote control of the flushing of the bowl with a push button actuator, and a tank mechanism having no moving parts suitable for use with specially formed tanks in permanent installations as a part of a building or structure.

A further object of this invention is the provision of a water closet as outlined above utilizing electric solenoid valves in conjunction with a siphon for fully automatic operation.

It is another object to provide a water closet in which the problem of sweating or moisture condensation on the walls of the tank is effectively eliminated.

A still further object of this invention is to provide a water closet as outlined above having a water tank of reduced size or capacity by the controlled supplementing of the volume of the tank with incoming water from an outside source of water.

Other objects and advantages of the invention will be apparent from the following description, the accompanying drawings and the appended claims.

In the drawings:

FIG. 1 is a vertical section through the tank and the bowl of a water closet embodying this invention;

FIG. 2 is a partially broken away section taken generally along line 2—2 of FIG. 1;

FIG. 3 is a bottom view of a portion of the apparatus of FIG. 2 showing the interconnection of the fill and flush valves;

FIG. 4 is a partially broken away top view of a portion of FIG. 2;

FIG. 5 illustrates a modified form of a portion of the invention;

FIG. 6 is a further modification of the invention for single valve operation;

FIG. 7 illustrates the invention as applied to a water closet with remote control and a tank adapted for building into a wall;

FIG. 8 is a section through the tank of FIG. 7 taken generally along line 8—8 of FIG. 7;

FIG. 9 is a modified tank arrangement suitable for use with this invention; and

FIGS. 10–12 are electrical schematic diagrams of the invention.

Referring to the drawings, which illustrate preferred embodiments of the invention, a water closet is shown in FIG. 1 as including a water storage tank 10 mounted above a bowl 11 in the usual manner. The tank 10 is connected for filling from a suitable source of water under pressure through a hand regulator valve 12 and a fill pipe 13.

Apparatus for controlling the filling of the tank 10 and the emptying into the bowl 11 may be divided roughly into an electrical unit which is contained within a totally enclosed plastic case 15 and a mechanical section consisting of tubular members of fixed length in contact with the water in the tank. The filling of the tank 10 with flushing water is effected by means of an electric solenoid fill valve 20 mounted within the case 15. The valve 20 is preferably of the diaphragm type for quiet operation and includes an inlet 21 (FIG. 3) connected to the fill pipe 13 by means of a T-section 23 and an intermediate pipe 24. The outlet 25 of the fill valve 20 is arranged to admit water into the tank 10 adjacent the bottom thereof through a vertical filling tube 28 extending from the outlet 25 downwardly into the tank 10. An opening 29 in the tube 28 adjacent the valve 20 prevents the suction of tank water into water supply line in case of failure of the water pressure and of the valve 20.

The water stored within the tank 10 is withdrawn from the tank and discharged downward into the bowl 11 during a cycle of operation by conduit means such as a siphon indicated generally at 30 in FIG. 1. The siphon 30 consists of an inner discharge pipe 32 mounted in upstanding relation to the tank 10 and sealed at the tank bottom by a rubber gasket 33, or other suitable material. It will be seen that the discharge pipe 32 and the seal 33 are fitted into the opening within the tank 10 normally provided for the ball valve of a conventional water closet. An outer closed end tube 34 is mounted in inverted spaced relation over the open end of the discharge pipe 30 on spacers 35 thereby forming an inlet end 36 of the siphon 28 opening into the tank 10 adjacent the bottom thereof for the withdrawal of water, and a discharge end 38 opening into the bowl 11. The uppermost portion of the discharge pipe 30 is positioned slightly above a normally full water line or level 39 in the tank 10 thus forming with the outer tube 34 a high point between the inlet and discharge ends of the siphon 30 normally preventing the withdrawal of water from the tank 10 until desired.

The area of the discharge pipe 32 and the effective area of the inlet 36 of the siphon are made to be substantially equal to each other for the greatest efficiency in the withdrawal of water from the tank. Also, the capacity of the siphon 30, or the rate at which the water may be removed, is greater than the rate at which water may be admitted into the tank through the fill pipe 13, thus assuring that the water level will not reach the electrical components within the case 15 and preventing the overflowing of the tank. The inner pipe 32 also forms an overflow spill pipe for the tank 10 preventing the accidental flooding of the tank.

Means for effecting the flooding of the high point of the siphon 30 to initiate siphoning action includes a second and manually operable electric solenoid valve 40, called a flush valve. The valve 40 is preferably of the diaphgram type for quiet operation and includes an inlet 41 arranged for connection with the T-section 23 and its outlet 42 tapped into the end cap 43 of the outer tube 34 and arranged to discharge water into the interior of the siphon 30. The flush valve 40 is positioned so as to discharge water downwardly into the discharge pipe 32 so as to flood the siphon over the high point, and at the same time, to initiate a movement of water through the siphon in a direction to effect the withdrawal of water from the tank to a normally empty level 45 coincident with the plane of the inlet 36.

The siphoning action thus initiated is very efficient and removes the water from the tank 10 and discharges this water into the bowl 11 with a uniform flow without vortexing at the inlet end 36. The siphon 30 includes control means for breaking the siphoning action just before the water reaches the bottom of the outer tube 32 in the form of a relatively small siphon breaking vent tube 46. The tube 46 extends through the end cap 43 of the tube 35 into the air above the water and downwardly into the discharge pipe 32 to a point somewhat higher than the normal empty level 45. The vent tube 46 operates to provide a gradual break in the siphoning action to prevent undesired suction noises as the water level approaches the empty level 45.

The operation of the flush valve 40 in flushing the bowl is initiated by a manual push button 50 which may be installed for convenience and access in the opening formed in the front wall of the tank 10 normally occupied by the flushing handle of the ordinary float-operated water closet. The push button 50, as well as the electric solenoid coils of the valves 20 and 40, form a portion of the electric circuits described in detail in connection with FIGS. 10-12.

Water level responsive switch means operable to establish desired water levels in the tank by effecting electric circuit changes upon the occurrence of predetermined high and low water levels includes a differential pressure responsive switch assembly 55 having a pressure sensing inlet tube 56 projecting through the bottom of the case 15. A pressure transmitting standpipe 58 extends downwardly into the tank from the inlet tube 56, where it is sealed thereto by a rubber stopper 59. The standpipe 58 is preferably terminated at a point slightly above the plane of the siphon inlet 36 so that any water which may be trapped therein is removed during each cycle of operation. The switch assembly 55 contains a pressure diaphragm 60 which operates a snap acting, microtype switch 61, as is diagrammatically illustrated in FIGS. 10-13.

Means are provided for operating the water closet in either a normally filled mode, which has the advantage of instant flushing operation, or a normally empty mode, which has the advantage of effectively eliminating the collection of moisture on the outer walls of the tank during humid conditions. This includes a transfer switch 65 mounted on the box 15 having one selectable position in the control circuit providing for normally filled tank operation and a second selectable position in the control circuit providing for normally empty tank operation.

The box 15, itself, is fully sealed against the intrusion of moisture and the like. It will be seen that the water closet of this invention includes no moving parts outside of the box 15, and in particular, no moving parts in contact with the water supply within the tank 10. The remainder of the electrical components housed within the box 15 includes a holding relay 66 and associated interconnecting wiring, as shown in FIG. 10.

In the schematic diagram of FIG. 10, the transfer switch 65 is shown as in the position corresponding to the normally full operation mode, the relay 66 is shown unenergized, and the switch assembly 55 is shown in the position corresponding to a full tank of water. Power input lines L1 and L2 apply power for the operation of the device, and may be directly connected to a suitable source of power or indirectly energized through an isolation transformer. Also, the associated electrical components may be of the low voltage type for operation from a step down isolation transformer, such as a door bell transformer.

The push button 50 is connected through the coil 67 of the holding relay 66 to effect a single cycle of operation in either mode of operation upon the momentary depression thereof. The push button 50 includes a small neon lamp 68 which is also momentarily energized from the line L1 through a protecting resistor 69. The lamp 68 causes the push button 50 to glow thus producing a visual indication of the operativeness of the device. A pair of relay contacts 71 are arranged in series with the coil 67 to operate as holding contacts. A second pair of relay contacts 72 are effective to apply line voltage from the line L2 for the energization and operation of the solenoid valves 20 and 40.

The switch 61 of the switch assembly 55 is arranged to close a first electric circuit path 75 upon the occurrence of the normal full water level 40, and is further arranged to close a second electric circuit path 76 upon the occurrence of a predetermined low water level. The transfer switch has a single-pole, double-throw contact 78 in the first circuit path arranged to energize the flush valve 40 and another single-pole, double-throw contact 79 in the second circuit path arranged to energize the fill valve 20. A third such contact 80 includes connections in each of these paths for the energization of the relay coil 67 through the holding contacts 71.

The operation of the embodiment described thus far is largely self-evident from the preceding description. The momentary depression of the button 50 operates to close the relay 66 through its holding contacts 71. Assuming that the transfer switch 65 is in the position corresponding to the normally filled mode, as shown, the flush valve 40 is energized through the contacts 72 to initiate siphoning action. This continues until a predetermined low water level is reached, which may be higher than the normally empty level 45 established by the siphon 30. At this point, the switch 61 in the assembly 55 transfers to the second circuit path 76 thus dropping out the relay 66 and closing the flush valve 40. This action also applies power from line L2 to the fill valve 20 through the contacts 79 of the transfer switch 65, thus causing the tank 10 to be filled after the siphon is broken by the tube 46. Upon the occurrence of the normally full water level 40, the position of the switch 61 reverses thereby breaking the connection to the fill valve 20 and the cycle is thus concluded.

With the transfer switch 65 in the normally empty mode, the cycle of operation is as follows. The push button 50 is again depressed to initiate a cycle, by energizing the relay coil 67. Since the tank 10 is empty, the relay 66 is held energized through its holding contacts 71 and the second circuit path 76 through the switch 61. The tank is thus filled through the fill valve 20 then immediately caused to empty through the siphon 30 by operation of the switch assembly 55 breaking the circuit to the relay 66 and making a circuit to the flush valve 40 through the first circuit path 75 and the contacts 78 of the transfer switch 65. The breaking of the first circuit path 75 upon the lowering of the water level close the flush valve 40 and permits the tank to empty, where it remains until the next cycle of operation.

The embodiment of FIG. 5 illustrates the manner in which an inverted U-shaped siphon tube 90 may be adapted to the tank of a water closet. This arrangement is similar to that of FIGS. 1–3 in that it is suitable for use in the modification of existing float and ball valve tanks to this invention. The discharge leg 91 of the tube 90 may be readily fitted into the bottom opening of the tank 10 and sealed thereto by a collar fitting 93 threaded from the inside of the tank into a nut 94 on the outside thereof. Suitable packing material indicated at 95 is employed between the collar fitting 93 and the tank to assure a water tight fit. The inlet leg 96 of the siphon 90 extends downwardly toward the bottom of the tank and forms an inlet opening 97 adjacent the tank bottom with an effective area of clearance roughly the same as, or greater than, the area of the opening of the tube 90.

The siphoning action of the flush valve 40 is directed through a jet pipe 98 positioned adjacent the inlet opening 97 to direct a stream of water upwardly into the tube 90 to cause the overflow of water over the high point 99. The water is then withdrawn in the manner described in connection with FIGS. 1–4. A vent tube 100, extending from the upper bend of the tube 90, where it is opened into the atmosphere, downwardly within the discharge leg 91 to a point above the plane of the inlet opening 97, operates to break the suction of the siphon. The apparatus of FIG. 5 is arranged to be operated by means of the same valves and electric circuit as previously described in connection with FIGS. 1–4 and 10.

FIG. 6 shows an arrangement using only a single solenoid valve operation where one valve serves for both the filling of the tank and the flooding of the siphon. The apparatus of FIG. 6 should be considered in conjunction with its wiring diagram of FIG. 12. A single electric solenoid valve 110 has its inlet connected to a suitable source of water under pressure and includes a filling tube 111 connected to its outlet and extending downwardly and opening adjacent the bottom of the tank 10.

A siphon 115, similar in general configuration to the siphon 30, includes an inner discharge pipe 116 with an outlet arranged for discharge into the bowl 11. An outer closed end tube 118 having a closure cap 119 positioned in inverted relation over the inner pipe 116 and held in spaced relation therefrom by spacers 120. A poppet valve 121 is mounted within the cap 119 of the outer tube 118 for the purpose of removing any air which might be entrapped within the siphon 115. This would occur, for instance, where, in a given installation, the lowermost end of the discharge tube 116 extended downwardly into contact with the water in the bowl 11.

Control circuit means for the valve 110 operable to cause the valve to fill the tank to a level below the top of the siphon 115 and further operable upon demand to flood the siphon 115 through the valve 110 is shown in FIG. 12 as including the push button 50 connected to the line L2 to energize the coil 67 of the relay 66. These components are arranged electrically similar to such components of FIG. 10. A slightly modified transfer switch 125 includes only two pairs of double-pole, single-throw contacts 126 and 127. The switch assembly 55 is arranged to close first and second circuit paths 128 and 129 upon the occurrence of full and low water levels within the tank 10 for controlling the single valve 110 through the transfer switch 125.

The energization of the relay 66 by the push button 50 causes the closing of its contacts 72 and its holding contacts 71 to open the valve 110. Assuming that the transfer switch 125 is in the position shown corresponding to normally full tank operation, and that the tank is full, the addition of water to the tank increases the water level above the normal full line to cause the flooding of the siphon 115, whereupon the tank 10 drains into the bowl 11.

The occurrence of a predetermined low water level causes the release of the holding coil 67 of the relay 66 by the switch assembly 55. The valve 110, however, will continue to be energized for the purpose of refilling the tank 10 through the second circuit path 129 including the contacts 127 of the switch 125. This filling continues until a normal full level is reached, which level is defined as being slightly below the top of the discharge tube 116, whereupon the switch assembly 55 breaks the circuit and ends the cycle of operation.

The cycle of operation in the normally empty mode, effected by moving the transfer switch 125 to its second position, is similar to the full operation except that the operation of the push button 50 initiates the filling action of the tank 10. Although the operation of the switch 61 in the switch assembly 55 releases the relay 66 upon the occurrence of the normal full level, the continued filling of the tank 10 and the flooding of the siphon 115 is effected through the first circuit path 128 and the transfer switch contacts 126. The lowering of the water level during the withdrawal action of the siphon effects the removal of line L2 from the valve 110 thus closing the valve and ending the cycle of operation with the water substantially drained from the tank 10.

The embodiments of FIGS. 7 and 8 illustrate certain practical advantages of this invention not heretofore brought out in connection with the previously described embodiments. The apparatus of the invention lends itself to physical separation into a remote electrical section 130 and a tank section 131. FIG. 7 illustrates a tank 132 which may be formed of sheet material such as copper or fiberglass permanently mounted for concealment into a wall 133. The tank 132 may have any convenient form, such as the substantially rectangular form shown for mounting between the upright studs 135. A sloping tank bottom 136 provides for substantially complete draining.

The tank 132 contains only tube-like components of fixed and predetermined length, and therefore contains no moving parts. A support structure for the internal tank components includes a shelf 138 which may be welded or otherwise suitably fixed to the interior of the tank adjacent its top. A fill tube 140 and a standpipe 142 are dependently carried on the shelf 38 by means of collars 143 and 144 fixed to the tube 140 and pipe 142. The shelf 138 is formed with a depending annular lip 145 within which the outer tube 146 of a siphon 148 is held. A siphon discharge pipe 149 may be held in upstanding relation within the outer tube 146 by a suitable opening formed in the tank bottom 136. The discharge pipe 149 may conveniently extend from the wall 133 and outwardly into a bowl, not shown.

The top of the tank is closed and sealed by a cover 150 which is suitably apertured to provide connection to the components within the tank. A rubber stopper 151, or other suitable fitting, is positioned in alignment with the discharge tube 149 for supporting a connection to the flush valve.

It will be seen that the electrical section 130 is positioned remotely from the tank section 131, and includes the valves 20 and 40, the switch assembly 55, the relay 66, the push button 50 and associated interconnecting wiring as previously described. The valves 20 and 40 and the switch assembly 50 are connected to the tank 132 through tubing 152 which may be suitably concealed in the wall 133. Also, the push button 50 itself, or any of the other electrical components, may be remotely positioned from the section 130, as convenient.

A further example of a tank formed of sheet material is shown at 160 in FIG. 9 as including an integrally formed compartment 161 within which the electrical section 130 of FIG. 7 may be placed for isolation from an integral water compartment 162. It is apparent that the invention provides flexibility in the design and placement of the water tank not heretofore realizable.

The invention also provides for the reduction in the minimum size of the water tank necessary for the flushing of the bowl. Such a reduction in size may be of advantage with the embodiment of FIGS. 7 and 8 where space may be at a premium. The circuit diagram of FIG. 11 is adapted for use with such a tank of reduced size. The reduction in size is effected by utilizing the incoming water from the water supply source to supplement the volume of the tank through both of the valves 20 and 40.

The electrical components of FIG. 11 are similar to those previously described in connection with FIG. 10 except for a holding relay 170 which has pairs of relay contacts 171, 172 and 173, and a modified transfer switch 175 which has pairs of single-pole, double-throw contacts 176–179. The connection of these components is such that the fill valve 20 operates to supplement the volume of the tank with outside water during the withdrawal of water from the tank by the siphon.

The switch assembly 55 is arranged to close a first circuit path 180 upon the occurrence of a normal full water level in the tank and is further arranged to close a second circuit path 181 upon the occurrence of a predetermined low water level. The contacts 176 of the transfer switch 175 are arranged to control the fill valve 20 and include a connection to the second circuit path 181, while the contacts 177 of the switch 175 are arranged to control the operation of the flush valve 40 and include a connection to the first circuit path 180. The holding relay 170 is controlled through its contacts 171 and the contacts 179 of the transfer switch 175.

Assuming that the tank is already full, the operation of the push button 50 energizes the flush valve 40 through the relay contacts 172 and simultaneously energizes the fill valve 20 through the relay contacts 173. Therefore, the valve 40 initiates flushing action by initiating siphoning action within the siphon while the valve 20 supplements the volume of the tank with additional water. However, since the capacity of the siphon is greater than the combined capacity of the valves 20 and 40, the tank empties into the bowl. When the tank is empty, the switch assembly 55 drops out the holding coil of the relay 170 which closes the flush valve 40. However, the valve 20 remains open through the second circuit path 181 and the contacts 176 of the transfer switch 65 to fill the tank. Upon reaching the normal full level, the switch assembly 55 closes the fill valve 20 thus completing the cycle of operation.

In the normally empty mode effected in the second position of the transfer switch 175, the push button 50 operates to open the fill valve 20 through the relay 170, but the flush valve 40 remains unenergized until the normal full level is reached, where the switch 61 in the switch assembly 55 drops out the relay 170. The flush valve 40 is then energized through the first circuit path 180 and the contacts 177 for emptying the tank. The fill valve 20 will continue to admit water into the tank through the first circuit path 180 and the contacts 177 in series with the contacts 172 and 176 until the tank is empty. At this point, the switch assembly opens the circuit path 180 thus closing the valves 20 and 40 and completing the cycle of operation.

It is therefore seen that this invention provides a versatile water closet adaptable to a great many different types of installations, either in the designing of new water closets or the modernization of old units, to meet and solve a great number of problems inherent in the present designs. The components employed are of relatively low cost with an extremely long and dependable service life, and the portions in contact with the water within the tank are not adversely affected by rust, corrosion, or lime deposit. Also, these components in contact with the water are members of fixed lengths thus eliminating all moving parts in contact with water. Accordingly, the invention lends itself to modern decorator designs and installations in that the tank may be permanently built into the wall or other structure or otherwise concealed. The normally empty mode of operation effectively eliminates the collection of moisture on the outer surfaces of the tank, called tank sweating, and the provision for selecting such modes provides versatility in climates or seasons where tank sweating is not a problem.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An automatic water closet comprising a bowl, a water storage tank above said bowl, water conduit means having an inlet end opening into said tank adjacent the bottom thereof for the withdrawal of water therefrom and a discharge end opening for discharge downward into said bowl with a high point therebetween, an electric solenoid valve having an inlet arranged for connection to a supply of water under pressure and an outlet arranged to effect the flooding of said high point with water for effecting flow of tank water through said conduit from said inlet end out of said discharge end into said bowl, circuit means for opening said solenoid valve causing the flushing of said bowl, and pressure responsive means including a vertical standpipe extending into said tank and a pressure responsive switch connected to close said valve upon the occurrence of a predetermined low water level in said tank.

2. An automatic water closet comprising a bowl, a water storage tank above said bowl, a siphon in said tank having an inlet opening thereinto adjacent the bottom thereof for the withdrawal of stored water therefrom and an outlet opening below said tank arranged for the discharge of water downward into said bowl, said siphon having a high point between said inlet and discharge openings above the normal water level in said tank preventing siphoning action, a vent tube in said siphon extending into the air above said water level and opening within said siphon at a point in said siphon above said inlet to initiate a gradual break in the siphoning action prior to the water level in said tank reaching said inlet, means for flooding said siphon with water over said high point to effect withdrawal of water from said tank into said bowl, and water level responsive means for establishing said water level in said tank.

3. An automatic water closet comprising a tank, a bowl, conduit means having an inner end opening into said tank for the withdrawal of water therefrom and a discharge end opening into said bowl with a high point therebetween above a normally full water line, an electric solenoid fill valve having an inlet arranged for connection to a supply of closet water and an outlet arranged to discharge water into said tank, water level responsive means arranged to close a first electric circuit upon the occurrence of said full water level and arranged further to close a second electric circuit upon the occurrence of a predetermined low water level, and transfer switch means arranged to energize said fill valve through said liquid level responsive means and having one position providing for normally filled tank operation and a second position providing for normally empty tank operation.

4. A water closet comprising a tank, a bowl, an electric solenoid fill valve having an inlet arranged for connection to a supply of closet water under pressure and an outlet arranged to admit water into said tank upon the opening of said valve, water level responsive means arranged to close a first electric circuit upon the occurrence of a full water level in said tank and arranged further to close a second electric circuit upon the occurrence of a predetermined low water level therein, manually operable means connected to operate said valve through said liquid level responsive means and including a transfer switch having one selectable contact in said first circuit path providing for normally filled tank operation and a second selectable contact in said second circuit path providing for normally empty tank operation.

5. A water closet comprising a tank, a bowl, an electric solenoid fill valve having an inlet arranged for connection to a supply of closet water under pressure and an outlet arranged to admit water into said tank upon the opening of said valve, water level responsive means arranged to close a first electric circuit upon the occurrence of a full water level in said tank and arranged further to close a second electric circuit upon the occurrence of a predetermined low water level therein, manually operable circuit means connected to operate said valve to effect a cycle of operation through said liquid level responsive means and including a transfer switch having one position in said first circuit providing for normally filled tank operation and a second position in said second circuit providing for normally empty tank operation, and a siphon having an inlet end opening into said tank for the withdrawal of water therefrom and an outlet end opening for discharge into said bowl with a high point above full water level, and means to effect the flooding of said high point during said cycle of operation in either position of said transfer switch.

6. An electric water closet comprising a bowl, a water storage tank above said bowl and having a storage capacity less than required for flushing said bowl, a siphon having an inlet opening into said tank adjacent the bottom thereof and an outlet opening into said bowl for the withdrawal of water from said tank and discharge into said bowl upon the initiation of siphoning action, an automatic electric control system including means for initiating said siphoning action to empty said tank, said circuit including an electric solenoid fill valve having an inlet arranged for connection to a source of closet water under pressure and an outlet arranged to discharge water from said source into said tank, and said initiating means connected to operate said valve for admitting water into said tank concurrently with the initiating of siphoning for supplementing the volume of said tank by water from said source to increase the quantity of water supplied to said bowl during flushing.

7. A water closet comprising a bowl, a water storage tank above said bowl, a siphon in said tank consisting of an inner discharge pipe having a discharge outlet opening into said bowl and extending upwardly into said tank, an inverted closed end outer tube positioned in spaced relation over said inner pipe concentric thereto and extending downwardly thereover forming therewith a water inlet adjacent the bottom of said tank, means connected to a source of supply water for filling said tank, and water discharge means opening directly into said inner pipe for causing the flooding of the upper end of said inner pipe with water by forcing the air out of said inner pipe through said discharge outlet to initiate siphoning action for the withdrawal of water from said tank into said bowl.

8. A water closet comprising a bowl, a water storage tank above said bowl, water discharge conduit means in said tank consisting of an inner discharge pipe having a discharge outlet opening directly into said bowl and extending upwardly into said tank, an inverted outer tube having a closed end positioned in spaced relation over said inner pipe and extending downwardly thereover forming therewith a water inlet adjacent the bottom of said tank, means connected to a source of supply water for filling said tank, and a flush valve having an outlet pipe received in the closed end of said outer tube and arranged to discharge downwardly directly into said inner pipe forcing the air out of said inner pipe and causing flow of water over the upper end of said inner pipe for the withdrawal of water from said tank into said bowl.

9. An electric water closet comprising a bowl, a water storage tank above said bowl, a siphon in said tank having an inlet opening adjacent the bottom thereof for the withdrawal of stored water from said tank and an outlet arranged to discharge downward into said bowl, said siphon having a high point between said inlet and outlet, and an electric control circuit for said closet including a single combined fill and flush valve connected to discharge water into said tank from a source of water under pressure and operable upon a signal to fill said tank and to flood said high point of siphon to effect withdrawal of said water from said tank into said bowl.

10. An electric automatic water closet providing for normally empty water tank operation comprising a water storage tank, conduit means in said tank having an inner end opening thereinto for the withdrawal of water therefrom and a discharge tank arranged to discharge into the bowl and forming a high point in said tank therebetween, an electric operating circuit providing a cycle of operation for causing the filling of said tank upon an initiating signal including electric fill valve means having an inlet arranged for connection to a supply of water and an outlet arranged to discharge water into said tank, means for flooding said siphon over said high point upon the filling of said tank, and water level responsive means for terminating said cycle of operation upon the emptying of said tank into the bowl by said conduit means.

11. An electric automatic toilet having a water storage tank with no moving parts in contact with the water therein, comprising conduit means in said tank consisting of tubular elements of fixed length and having an inlet opening thereinto for the withdrawal of water therefrom and an outlet arranged to discharge said water from said tank downwardly into the bowl, an electric control circuit including a valve having an inlet arranged for connection to a source of water under pressure and an outlet connected to effect water flow through said conduit means from said inlet opening through said outlet means for the emptying of said tank, and a pressure operated level sensing switch provided with a fixed standpipe extended generally downwardly into said tank for the transmission of water pressure to said switch indicative of the water level in said tank.

12. An electric automatic toilet having a water storage tank with no moving parts in contact with the water therein, comprising a siphon in said tank consisting of tubular elements of fixed length having an inlet opening thereinto for the withdrawal of water therefrom and an outlet arranged to discharge said water from said tank downwardly into the bowl, an electric control circuit including a solenoid valve having an inlet arranged for connection to a source of water under pressure and an outlet connected through a fixed pipe to effect the flooding of said siphon for the emptying of said tank, a separate solenoid fill valve for discharging directly into said tank through a fixed fill pipe, and a pressure operated level sensing switch provided with a fixed standpipe extended generally downwardly into said tank for the transmission of water pressure to said switch indicative of the water level in said tank.

13. A siphon device for removing liquids from a liquid container from an upper liquid level to a lower liquid level, comprising an inner liquid discharge pipe positioned generally upright in said container with an upper open end and a lower end arranged to discharge liquid from said container, an outer tube of greater diameter than said discharge pipe having an upper closed end and positioned over the open upper end of said discharge pipe in spaced relation thereto providing an inlet between the inside diameter of said outer tube and the outside diameter of said discharge pipe in communication with the interior of said discharge pipe, means for initiating flow from said container through said inlet and into said discharge pipe, and control means for admitting air directly into the interior of said discharge pipe including an open vent tube supported in said outer tube extending from the air above said upper liquid level downwardly into said discharge pipe and opening therein adjacent said outlet above said lower liquid level for initiating a gradual break in the siphoning action prior to the liquid reaching said lower level.

14. A siphon device for removing liquids from a liquid container, comprising an inner liquid discharge pipe formed of tubular material and positioned generally upright in said container with an upper open end and a lower end arranged to discharge liquid from said container, an outer tube of greater diameter than said discharge pipe having an upper closed end, spacer means supporting said tube over the open upper end of said discharge pipe in spaced concentric relation thereto providing an annular inlet between the inside diameter of said outer tube and the outside diameter of said discharge pipe in communication with the interior of said discharge pipe, means for initiating flow from said container through said inlet and into said discharge pipe including a valve having an inlet connected to a source of liquid under pressure and an outlet arranged to discharge directly into said discharge pipe, and a vent tube extending into said discharge pipe and terminating therein above said inlet for admitting air directly into the interior of said discharge pipe for initiating a break in the siphoning action prior to the liquid reaching said inlet.

15. A device for removing liquids from a liquid container, comprising an inner liquid discharge pipe formed of tubular material and positioned generally upright in said container with an upper open end and a lower end arranged to discharge liquid from said container, an outer tube of greater diameter than said discharge pipe having an upper closed end and positioned over the open upper end of said discharge pipe in spaced concentric relation thereto providing an annular inlet between the inside diameter of said outer tube and the outside diameter of said discharge pipe in communication with the interior of said discharge pipe, means for initiating flow from said container through said inlet and into said discharge pipe including an electric solenoid valve connected to a source of liquid under pressure and having an outlet received through said closed end and arranged to direct liquid directly into said discharge pipe toward said discharge end, and control means for admitting air directly into said discharge pipe for gradually breaking the liquid flow therethrough including a vent tube extending through said closed end and opening at the top into the air space above the liquid in said container and opening at the bottom into said discharge pipe adjacent said inlet and above said lower discharge end.

References Cited in the file of this patent
UNITED STATES PATENTS

| | | |
|---|---|---|
| 1,185,474 | Burke | May 30, 1916 |
| 2,068,252 | Weber | Jan. 19, 1937 |
| 2,073,835 | Finley et al. | Mar. 16, 1937 |
| 2,143,469 | Banks | Jan. 10, 1939 |
| 2,491,130 | Owens | Dec. 13, 1949 |
| 2,707,482 | Carter | May 3, 1955 |
| 2,858,546 | Tekenos | Nov. 4, 1958 |
| 2,881,450 | Tubbs | Apr. 14, 1959 |
| 2,888,945 | Marlow | June 2, 1959 |